United States Patent
Kim et al.

(10) Patent No.: US 9,845,407 B2
(45) Date of Patent: Dec. 19, 2017

(54) POLYMER ELECTRET AND METHOD OF MANUFACTURING THE SAME

(71) Applicant: Samsung Display Co. Ltd., Yongin, Gyeonggi-Do (KR)

(72) Inventors: Myung Im Kim, Yongin-si (KR); Won Sang Park, Yongin-si (KR); Yi Joon Ahn, Seoul (KR); Suk Man Yang, Seoul (KR); Yong Suk Yeo, Seongnam-si (KR); Tae Hee Lee, Gumi-si (KR)

(73) Assignee: Samsung Display Co., Ltd. (KR)

( * ) Notice: Subject to any disclaimer, the term of this patent is extended or adjusted under 35 U.S.C. 154(b) by 260 days.

(21) Appl. No.: 14/644,996

(22) Filed: Mar. 11, 2015

(65) Prior Publication Data
US 2016/0102223 A1   Apr. 14, 2016

(30) Foreign Application Priority Data
Oct. 10, 2014  (KR) .................. 10-2014-0136780

(51) Int. Cl.
| C09D 153/02 | (2006.01) |
| H01G 7/02 | (2006.01) |
| C09D 153/00 | (2006.01) |

(52) U.S. Cl.
CPC ......... C09D 153/02 (2013.01); C09D 153/00 (2013.01); H01G 7/02 (2013.01); H01G 7/023 (2013.01)

(58) Field of Classification Search
CPC .... C09D 153/02; C09D 153/00; B01D 69/12; B01D 71/36; H01G 7/02; H01G 7/023
See application file for complete search history.

(56) References Cited

U.S. PATENT DOCUMENTS

| 8,503,702 B2 | 8/2013 | Kao et al. |
| 2004/0124147 A1* | 7/2004 | Fissell, IV .......... A61M 1/3489 210/650 |
| 2011/0186437 A1* | 8/2011 | Huang .................... C25D 5/18 205/95 |
| 2013/0044906 A1 | 2/2013 | Lee et al. |
| 2016/0064216 A1* | 3/2016 | Nakaoka ............... G03F 1/0046 438/700 |

FOREIGN PATENT DOCUMENTS

| JP | 2006-291045 | 10/2006 |
| JP | 5505538 | 10/2013 |
| KR | 1020130036856 A | 4/2013 |

\* cited by examiner

*Primary Examiner* — Hai Vo
(74) *Attorney, Agent, or Firm* — Innovation Counsel LLP

(57) ABSTRACT

Provided is a method of manufacturing a polymer electret. The method of manufacturing a polymer electrets includes forming a polymer thin film, which includes a block copolymer (BCP) having two or more polymer chains covalently bonded together; forming a nano-structure of the BCP in which a first block formed by first polymer chains that self-assemble together and a second block formed by second polymer chains that self-assemble together are micro-phase-separated, by performing an annealing process on the polymer thin film; forming a porous polymer film with a nano-pore by selectively removing one of the first block and the second block; and charging the porous polymer film.

6 Claims, 12 Drawing Sheets

POLYMER ELECTRET AND METHOD OF MANUFACTURING THE SAME

This application claims priority to Korean Patent Application No. 10-2014-0136780 filed on Oct. 10, 2014 in the Korean Intellectual Property Office, the disclosure of which is incorporated herein by reference in its entirety.

BACKGROUND

1. Field of the Invention

The invention relates to a polymer electret and a method of manufacturing the same.

2. Description of the Related Art

Electrets are charge carriers formed from a material that can maintain a dielectric polarization that was generated by the application of an electric field even after the electric field is removed. Electrets correspond to permanent magnets.

Electrets may be used as diaphragms of an acoustic device. More specifically, electrets may be used as diaphragms in condenser microphones, as diaphragms in loud speakers by converting variations in electric signals into acoustic vibrations that can be heard by humans, or as diaphragms in ultrasound sensors.

Well-known electrets include porous electrets that are formed of polytetrafluoroethylenem (PTFE) through mechanical stretching.

SUMMARY

An electret with high porosity and a method of manufacturing the same are provided.

However, example embodiments are not restricted to those set forth herein. The above and other example embodiments will become more apparent to one of ordinary skill in the art to which the invention pertains by referencing the detailed description given below.

A method of manufacturing a polymer electret includes forming a polymer thin film, which includes a block copolymer (BCP) having two or more polymer chains covalently bonded together; forming a nano-structure of the BCP in which a first block formed by first polymer chains that self-assemble together and a second block formed by second polymer chains that self-assemble together are micro-phase-separated, by performing an annealing process on the polymer thin film; forming a porous polymer film with a nano-pore by selectively removing one of the first block and the second block; and charging the porous polymer film.

The BCP may be at least one selected from the group consisting of PS-b-PB (polystyrene-b-polybutadiene)), PS-b-PI (polystyrene-b-polyisoprene), PS-b-PMMA (polystyrene-b-poly(methyl methacrylate)), PS-b-P2VP (polystyrene-b-poly(2-vinylpyridine)), PS-b-PFDMS (polystyrene-b-poly(ferrocenyl-dimethylsilane)), PS-b-PtBA (polystyrene-b-poly(tert-butylacrylate)), PS-b-PFEMS (polystyrene-b-poly(ferrocenylethylmethylsilane)), PI-b-PEO (polyisoprene-b-poly(ethyleneoxide)), PB-b-PVP (polybutadiene-b-poly(butadiene-b-vinylpyridinium)), PtBA-b-PCEMA (poly(tert-butylacrylate)-b-poly(cinnamoyl-ethylmethacrylate)), PS-b-PLA (polystyrene-b-polyactide), PaMS-b-PHS (poly($\alpha$-methylstyrene)-b-poly(4-hydroxystyrene)), PPDPS-b-P4VP (pentadecyl phenol modified polystyrene-b-poly(4-vinylpyridine)), PS-b-PEO (poly(styrene-b-ethyleneoxide)), PS-b-PDMS (polystyrene-b-poly(dimethyl siloxane)), PS-b-PE (polystyrene-b-polyethylene)), PS-b-PFS (polystyrene-b-poly(ferrocenyl dimethyl silane)), PS-b-PPP (polystyrene-b-poly(paraphenylene)), PS-b-PB-b-PS, PS-b-PI-b-PS, PEO-b-PPO (Poly(propyleneoxide))-b-PEO, PVPDMPS (poly(4-vinyl-phenyldimethyl-2-propoxysilane))-b-PI-b-PVPDMPS, PS-b-P2VP-b-PtBMA and a block copolymer thereof.

The polymer thin film may further include a fluorine-based polymer. The fluorine-based polymer may be at least one selected from the group consisting of polytetrafluoroethylene (PTFE), poly(perfluoroalkyl acrylate) (PFA), polychlorotrifluoroethylene (PCTFE), fluorinated ethylenepropylene resin (FEP), polychloro-trifluoroethylene (PCFE), polyvinylidenefluoroide (PVDF) and a copolymer thereof.

The polymer thin film may be a block copolymer from copolymerizing the BCP and a fluorine-based polymer.

The nano-pore may have a size of 5 nm to 100 nm.

The charging the polymer thin film may include injecting positive charge or negative charge into the polymer thin film with the use of an electron beam, corona discharge, an ion gun or an electron beam.

The annealing process may be one selected from the group consisting of thermal annealing and solvent annealing.

The first block may be a hydrophobic block.

The second block may be a hydrophilic block.

The nano-structure may be one selected from the group consisting of a spherical nano-structure, a cylindrical nano-structure, a gyroidal nano-structure, a lamellar nano-structure and a hexagonally perforated lamellar (HPL) nano-structure and arranged periodically.

A polymer electret according to an example embodiment of the invention, includes a polymer template; a nanopore having a size of 5 nm to 100 nm; and electric charge.

The nanopore may be one selected from the group consisting of a spherical nano-pore, a cylindrical nano-pore, a gyroidal nano-pore, a lamellar nano-pore and an HPL nano-pore and arranged periodically.

The polymer template may include the fluorine-based polymer.

The electric charge may be positive charge.

The polymer template and the nano-pore originate from a self-assembly of a BCP in which at least one first block and at least one second block are micro-phase-separated. The nano-pore is formed where the first block is removed. The polymer template is a self-assembly of the BCP having the first block removed therefrom and including the second block.

The BCP may be at least one selected from the group consisting of PS-b-PB, PS-b-PI, PS-b-PMMA, PS-b-P2VP, PS-b-PFDMS, PS-b-PtBA, PS-b-PFEMS, PI-b-PEO, PB-b-PVP, PtBA-b-PCEMA, PS-b-PLA, PaMS-b-PHS, PPDPS-b-P4VP, PS-b-PEO, PS-b-PDMS, PS-b-PE, PS-b-PFS, PS-b-PPP, PS-b-PB-b-PS, PS-b-PI-b-PS, PEO-b-PPO-b-PEO, PVPDMPS-b-PI-b-PVPDMPS, PS-b-P2VP-b-PtBMA and a BCP thereof.

The first block may be a hydrophobic block and the second block may be a hydrophilic block.

Because a nano-pore is formed by removing one of a first block and a second block from a self-assembly of a block copolymer (BCP), in which the first block and the second block is micro-phase-separated, it is possible to provide a polymer electret with improved porosity and polarizability.

Also, it is possible to provide various polymer electrets with different properties by blending or polymerizing a BCP that can be blended or polymerized with various polymers. For example, a polymer electret with improved polarizability and elasticity can be provided by adding an elastomer.

Also, it is possible to provide a polymer electret with improved tolerance to moisture by selectively removing a hydrophilic block from a BCP consisting of the hydrophilic block and a hydrophobic block.

Other features and example embodiments will be apparent from the following detailed description, the drawings, and the claims.

BRIEF DESCRIPTION OF THE DRAWINGS

The above and other objects, features and advantages of the present disclosure will be more apparent from the following detailed description taken in conjunction with the accompanying drawings, in which.

DETAILED DESCRIPTION OF THE EMBODIMENTS

Figure 1:
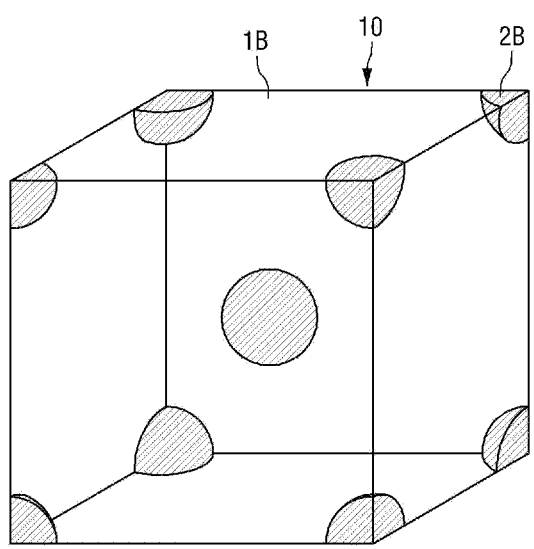
FIG. 1 is a schematic diagram illustrating a self-assembly of a block copolymer (BCP) with spherical nano-structures.

Features of the inventive concept and methods of accomplishing the same may be understood more readily by reference to the following detailed description of example embodiments and the accompanying drawings. The inventive concept may, however, be embodied in many different forms and should not be construed as being limited to the embodiments set forth herein. Rather, these embodiments are provided so that this disclosure will convey the concept of the inventive concept to those of ordinary skill in the relevant art.

In the drawings, the thickness of layers and regions are exaggerated for clarity. It will be understood that when an element or layer is referred to as being "on," "connected to" or "coupled to" another element or layer, the element or layer can be directly on, connected or coupled to another element or layer, or one or more intervening elements or layers may be present. In contrast, when an element is referred to as being "directly on," "directly connected to" or "directly coupled to" another element or layer, there are no intervening elements or layers present. As used herein, connected may refer to elements being physically, electrically, operably, and/or fluidly connected to each other.

Like numbers refer to like elements throughout. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the disclosure.

Spatially relative terms, such as "below," "lower," "under," "above," "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "below" or "beneath" relative to other elements or features would then be oriented "above" relative to the other elements or features. Thus, the example term "below" can encompass both an orientation of above and below, depending on the orientation. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises," "comprising," "includes" and/or "including," when used in this specification, specify the presence of stated features, integers, operations, elements, and/or components, but do not preclude the presence or addition of one or more other features, integers, steps, operations, elements, components, and/or groups thereof. Expressions such as "at least one of," when preceding a list of elements, modify the entire list of elements and do not modify the individual elements of the list. Further, the use of "may" when describing embodiments refers to "one or more embodiments." Also, the term "example" is intended to refer to an example or illustration. As used herein, the terms "use," "using," and "used" may be considered synonymous with the terms "utilize," "utilizing," and "utilized," respectively.

Example embodiments will hereinafter be described with reference to the accompanying drawings.

A block copolymer (BCP) is a polymer consisting of two or more polymer chains that are covalently bonded together, and a copolymer is a polymer consisting of two or more types of monomers. Two or more polymer chains that constitute a BCP may have mutually exclusive chemical properties. For example, one of the polymer chains may consist of hydrophobic polymers, and another polymer chain may consist of hydrophilic polymers.

In response to the properties of two or more polymer chains of a BCP being mutually exclusive, a voluntary phase separation phenomenon may occur, which is referred to as the self-assembly characteristic of a BCP.

In a self-assembly of a BCP, micro-phase separation occurs in which a first block formed by the first polymer chains self-assemble together, and a second block formed by the second polymer chains self-assemble together, and the first and second blocks appear periodically. The first block may be a hydrophobic block, and the second block may be a hydrophilic block. Alternatively, the first block may be a hydrophilic block, and the second block may be a hydrophobic block.

The terms "first polymer chain" and "second polymer chain" are used herein to distinguish polymer chains with different chemical properties from each other, and as a result, the term "BCP" or "block copolymer", as used herein, does not necessarily mean a diblock copolymer consisting of a first polymer chain and a second polymer chain.

That is, the term "BCP" or "block copolymer", as used herein, encompasses a diblock copolymer and a triblock copolymer.

In a non-limiting example, the BCP may encompass a block copolymer of at least two different polymers selected from among polystyrene (PS), polyisoprene (PI), polybutadiene (PB), poly(methyl methacrylate) (PMMA), poly(2-vinylpyridine) (P2VP), poly(ferrocenyl-dimethylsilane) (PFDMS), poly(tert-butylacrylate) (PtBA), poly(ferrocenylethylmethylsilane) (PFEMS), poly(methyltetracyclododecene) (PMTCDD), polyethyleneoxide (PEO), polypropyleneoxide (PPO), poly(butadiene-b-vinylpyridinium) (PVP), poly(cinnamoyl-ethylmethacrylate) (PCEMA), polyactide (PLA), poly(α-methylstyrene) (PaMS), poly(4-hydroxystyrene) (PHS), pentadecyl phenol modified polystyrene (PPDPS), poly(4-vinylpyridine) (P4VP), poly(dimethyl siloxane) (PDMS), polyethylene (PE), poly(ferrocenyl dimethyl silane) (PFS), poly(paraphenylene) (PPP), poly(4-vinylphenyldimethyl-2-propoxysilane) (PVPDMPS).

In a non-limiting example, the BCP may encompass PS-b-PB (polystyrene-b-polybutadiene)), PS-b-PI (polystyrene-b-polyisoprene), PS-b-PMMA (polystyrene-b-poly(methyl methacrylate)), PS-b-P2VP (polystyrene-b-poly(2-vinylpyridine)), PS-b-PFDMS (polystyrene-b-poly(ferrocenyl-dimethylsilane)), PS-b-PtBA (polystyrene-b-poly(tert-butylacrylate)), PS-b-PFEMS (polystyrene-b-poly(ferrocenylethylmethylsilane)), PI-b-PEO (polyisoprene-b-poly(ethyleneoxide)), PB-b-PVP (polybutadiene-b-poly(butadiene-b-vinylpyridinium)), PtBA-b-PCEMA (poly(tert-butylacrylate)-b-poly(cinnamoyl-ethylmethacrylate)), PS-b-PLA (polystyrene-b-polyactide), PaMS-b-PHS (poly(α-methylstyrene)-b-poly(4-hydroxystyrene)), PPDPS-b-P4VP (pentadecyl phenol modified polystyrene-b-poly(4-vinylpyridine)), PS-b-PEO (poly(styrene-b-ethyleneoxide)), PS-b-PDMS (polystyrene-b-poly(dimethyl siloxane)), PS-b-PE (polystyrene-b-polyethylene)), PS-b-PFS (polystyrene-b-poly(ferrocenyl dimethyl silane)), PS-b-PPP (polystyrene-b-poly(paraphenylene)), PS-b-PB-b-PS, PS-b-PI-b-PS, PEO-b-PPO (poly(propyleneoxide))-b-PEO, PVPDMPS (poly(4-vinyl-phenyldimethyl-2-propoxysilane))-b-PI-b-PVPDMPS, PS-b-P2VP-b-PtBMA and a BCP thereof.

A nano-structure of a BCP may have a spherical, cylindrical, gyroidal, lamellar or hexagonally perforated lamellar (HPL) structure. In a self-assembly of the BCP, one or more spherical, cylindrical, gyroidal, lamellar or HPL nano-structures may be periodically arranged.

Table 1 below shows examples of the structure of nano-structures of BCPs, but the invention is not limited thereto. That is, even BCPs having the same ingredients may form different types of nano-structures depending on the relative amounts of the ingredients thereof, and the size of nano-structures of a BCP may be freely adjusted within a particular range based on the molecular weight of the BCP.

TABLE 1

| Block Copolymer | Nano-Structure | Block Copolymer | Nano-Structure |
| --- | --- | --- | --- |
| PS-b-PB | Cylindrical | PS-b-P2VP | Spherical or lamellar |
| PS-b-PI | Spherical | PS-b-PB-b-PS | Cylindrical |
| PS-b-PMMA | Spherical, cylindrical, or lamellar | PS-b-PI-b-PS | Lamellar |
| PS-b-PFDMS | Spherical or cylindrical | PS-b-PFEMS | Cylindrical |
| PS-b-PtBA | Spherical | PtBA-b-PCEMA | Cylindrical |

FIG. 1 is a schematic diagram illustrating a self-assembly of a BCP with spherical nano-structures. More specifically, FIG. 1 illustrates a unit lattice of the self-assembly of the BCP with spherical nano-structures.

Referring to FIG. 1, a self-assembly 10 of a BCP includes spherical nano-structures. The self-assembly 10 includes a first block 1B, which is cubical, and a plurality of second blocks 2B, which are spherical and are formed in the first block 1B. The first block 1B and second blocks 2B are micro-phase-separated. The second blocks 2B periodically form a plurality of spherical nano-structures, respectively, in a polymer template formed by the first block 1B.

The self-assembly 10 of the BCP with spherical nano-structures may be fabricated by forming a polymer blend including a block copolymer in a liquid or molten phase, forming a polymer thin film with the use of a coating method such as spin coating or bar coating and subjecting the polymer thin film to thermal annealing or solvent annealing.

The self-assembly 10 of the BCP with spherical nano-structures may also be fabricated by subjecting a polymer including a BCP to solution casting or melt casting, so as to form a polymer thin film, and subjecting the polymer thin film to thermal annealing or solvent annealing.

Thermal annealing is a method of inducing micro-phase separation by heating a BCP to a temperature higher than the glass transition temperature of the BCP, and solvent annealing is a method of inducing micro-phase separation by exposing a polymer thin film containing a BCP to a solvent vapor so as to impart mobility to polymer chains.

For example, self-assembly of PS-b-PMMA may be induced at a temperature of about 100° C. or higher by thermal annealing. Alternatively, thermal annealing may be performed on PS-b-PMMA in a highly-vacuum atmosphere excluding oxygen at a temperature of about 250° C., in which case, a regular self-assembly may be formed within a short period of time due to a smooth molecular flow.

The second blocks 2B are illustrated in FIG. 1 as forming spherical nano-structures, but the invention is not limited thereto. That is, the first block 1B may form a spherical nano-structure.

Figure 2:
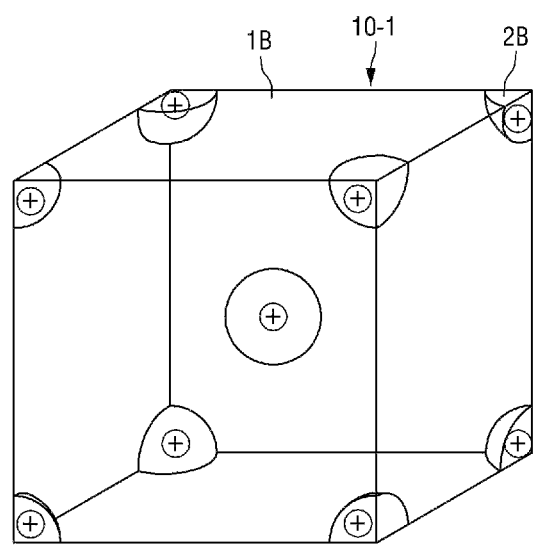
FIG. 2 is a schematic diagram illustrating a polymer electret with spherical nano-pores, according to a first example embodiment.

FIG. 2 is a schematic diagram illustrating a polymer electret with spherical nano-pores, according to a first example embodiment. Because the spherical nano-pores are formed where the second blocks 2B are removed, the spherical nano-pores will hereinafter be indicated by the same reference numeral as the second blocks 2B.

The spherical nano-pores 2B may be formed by dissolving the self-assembly 10 of the copolymer with spherical nano-structures in a solvent with selective affinity to the second blocks 2B so as to remove the second blocks 2B.

The size of the spherical nano-pores 2B may range from 5 nm to 100 nm. The size of the spherical nano-pores 2B, which ranges from 5 nm to 100 nm, is determined by the self-assembly properties of the BCP with spherical nano-structures, and may correspond to the size of polymer chains that form the BCP with spherical nano-structures.

A polymer electret 10-1 of FIG. 2 with the spherical nano-pores 2B may be charged by injecting positive charge into the polymer electret 10-1 with the use of an electron beam, a corona discharge, an ion gun or an electron gun.

The spherical nano-pores 2B are illustrated in FIG. 2 as being positively charged, but the invention is not limited thereto. For example, negative charge may be injected into the spherical nano-pores 2B.

EXAMPLE 1

10 wt % PS-b-PMMA was dissolved in toluene and the toluene solution of 10 wt % PS-b-PMMA was coated on a base substrate. A PS-b-PMMA film was formed by vaporizing toluene in the toluene solution of 10 wt % PS-b-PMMA. The PS-b-PMMA film was treated at 250° C. and then by ultraviolet radiation. Degradated PMMA block was removed by acetic acid washing. The resulting product was discharged by corona discharge process (conditions: needle (15.0 kV), mesh (1.0 kV), 1 min).

EXAMPLE 2

10 wt % PS-b-PI was dissolved in toluene and the toluene solution of 10 wt % PS-b-PI was coated on a base substrate. A PS-b-PI film was formed by vaporizing toluene in the toluene solution of 10 wt % PS-b-PI. The PS-b-PI film was treated at 250° C. and PI block was etched using ozone and completely removed by isopropyl alcohol washing. The resulting product was discharged by corona discharge process (conditions: needle (15.0 kV), mesh (1.0 kV), 1 min).

Figure 3:
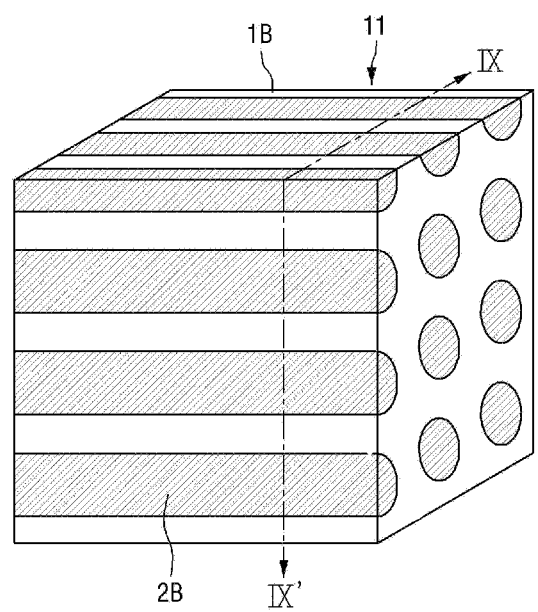
FIG. 3 is a schematic diagram illustrating a self-assembly of a BCP with cylindrical nano-structures.

FIG. 3 is a schematic diagram illustrating a self-assembly of a BCP with cylindrical nano-structures. More specifically, FIG. 3 illustrates a unit lattice of the self-assembly of the BCP with cylindrical nano-structures.

Referring to FIG. 3, a self-assembly 11 of a BCP includes cylindrical nano-structures. The self-assembly 11 includes a first block 1B, which is cubical, and a plurality of second blocks 2B, which are cylindrical and are formed in the first block 1B. The first block 1B and second blocks 2B are micro-phase-separated. The second blocks 2B periodically form a plurality of cylindrical nano-structures, respectively, in a polymer template formed by the first block 1B.

The self-assembly 11 includes cylindrical second blocks 2B, and thus differs from the self-assembly 10 including cylindrical nano-structures.

Figure 4:
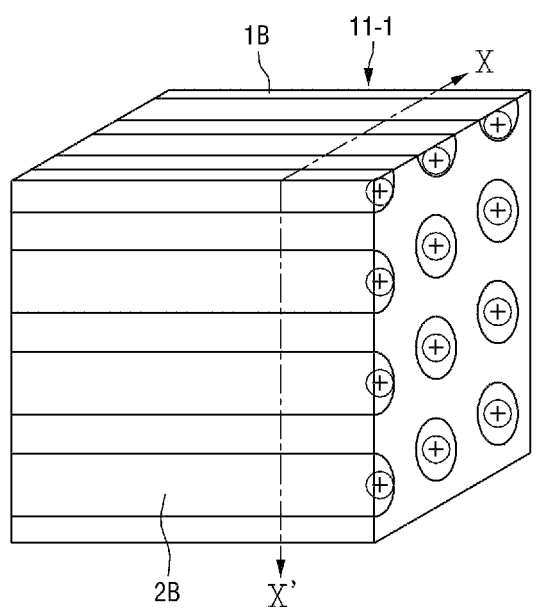
FIG. 4 is a schematic diagram illustrating a polymer electret with cylindrical nano-pores, according to a second example embodiment.

FIG. 4 is a schematic diagram illustrating a polymer electret with cylindrical nano-pores, according to a second example embodiment.

Referring to FIG. 4, a polymer electret 11-1 differs from the polymer electret 10-1 of the first example embodiment in that it includes cylindrical nano-pores 2B, instead of spherical nano-pores.

Figure 5:
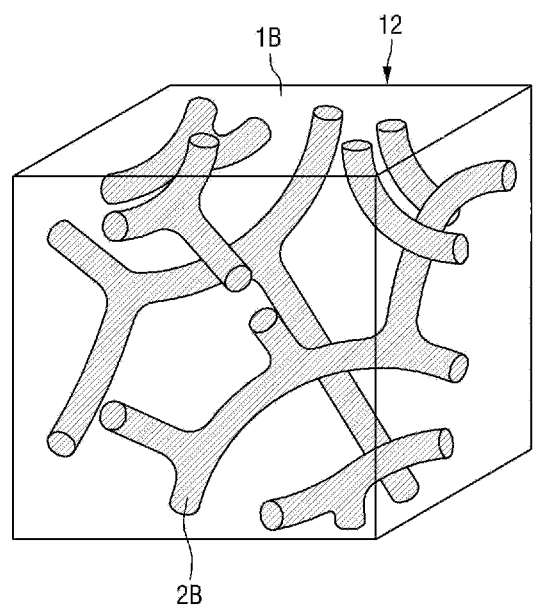
FIG. 5 is a schematic diagram illustrating a self-assembly of a BCP with gyroidal nano-structures.

FIG. 5 is a schematic diagram illustrating a self-assembly of a BCP with gyroidal nano-structures. More specifically, FIG. 5 illustrates a unit lattice of the self-assembly of the BCP with gyroidal nano-structures.

Referring to FIG. 5, a self-assembly 12 of a BCP includes gyroidal nano-structures. The self-assembly 12 includes a first block 1B, which is cubical, and a plurality of second blocks 2B, which are gyroidal and are formed in the first block 1B. The first block 1B and second blocks 2B are micro-phase-separated. The second blocks 2B periodically form a plurality of gyroidal nano-structures, respectively, in a polymer template formed by the first block 1B.

The self-assembly 12 includes gyroidal second blocks 2B, and thus differs from the self-assembly 10 that includes spherical nano-structures.

Figure 6:
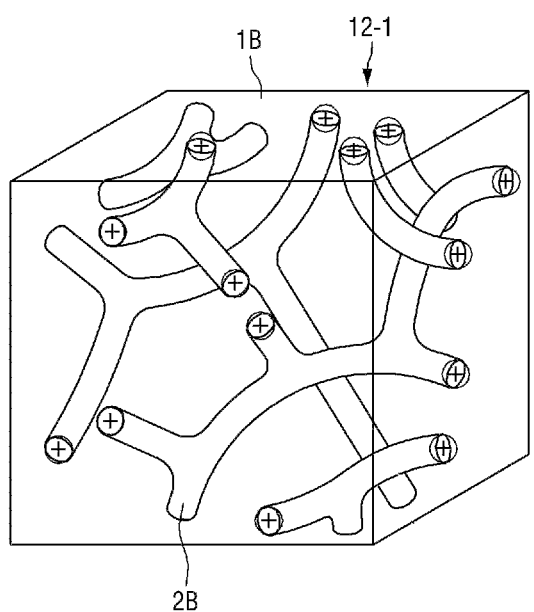
FIG. 6 is a schematic diagram illustrating a polymer electret with gyroidal nano-pores, according to a third example embodiment.

FIG. 6 is a schematic diagram illustrating a polymer electret with gyroidal nano-pores, according to a third example embodiment.

Referring to FIG. 6, a polymer electret 12-1 differs from the polymer electret 10-1 of the first example embodiment in that it includes gyroidal nano-pores 2B, instead of spherical nano-pores.

Figure 7:
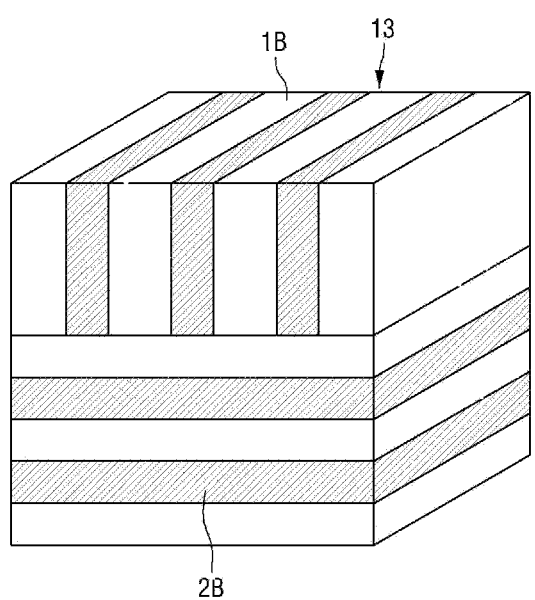
FIG. 7 is a schematic diagram illustrating a self-assembly of a BCP with lamellar nano-structures.

FIG. 7 is a schematic diagram illustrating a self-assembly of a BCP with lamellar nano-structures. More specifically, FIG. 7 illustrates a unit lattice of the self-assembly of the BCP with lamellar nano-structures.

Referring to FIG. 7, a self-assembly 13 of a BCP includes lamellar nano-structures. Self-assembly 13 includes a first block 1B, which is cubical, and a plurality of second blocks 2B, which are lamellar and are formed in the first block 1B. The first block 1B and second blocks 2B are micro-phase-separated. The second blocks 2B periodically form a plurality of lamellar nano-structures, respectively, in a polymer template formed by the first block 1B.

The self-assembly 13 includes multiple domains, i.e., a lower domain and an upper domain which differ from each other in terms of the direction of the alignment of lamellar nano-structures therein. More specifically, in the lower domain, lamellar nano-structures 2B are aligned in a first direction, whereas in the upper domain, lamellar nano-structures 2B are aligned in a second direction, which is perpendicular to the first direction. However, the first direction and the second direction that are perpendicular to each other are only one example, and the directions of the alignment of nano-structures in the upper domain and the upper domain are not limited to the first direction and the perpendicular second direction, but may include a variety of directions.

The self-assembly 13 includes lamellar second blocks 2B, and thus differs from the self-assembly 10 including spherical nano-structures.

Figure 8:
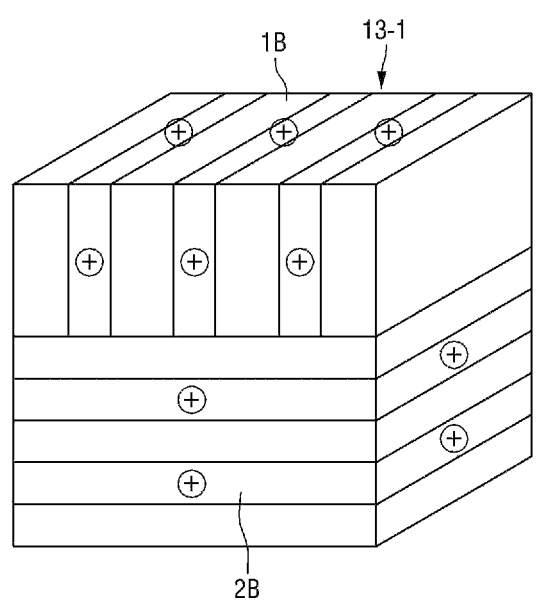
FIG. 8 is a schematic diagram illustrating a polymer electret with lamellar nano-pores, according to a fourth example embodiment.

FIG. 8 is a schematic diagram illustrating a polymer electret with gyroidal nano-pores, according to a third example embodiment of the invention.

Referring to FIG. 8, a polymer electret 13-1 differs from the polymer electret 10-1 of the first example embodiment in that it includes lamellar nano-pores 2B, instead of spherical nano-pores.

A polymer electret according to an example embodiment will hereinafter be described, taking the polymer electret 11-1 with cylindrical nano-structures as an example.

Figure 9:
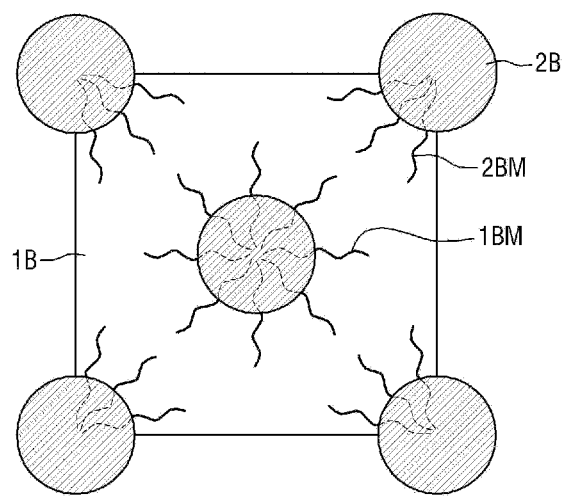
FIG. 9 is a cross-sectional view taken along line IX-IX' of FIG. 3.
Figure 10:
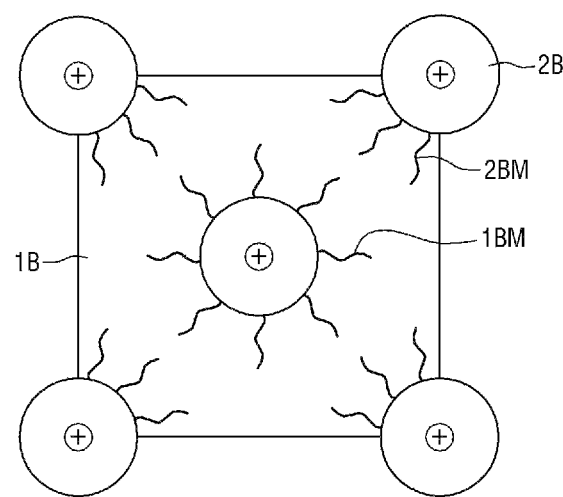
FIG. 10 is a cross-sectional view taken along line X-X' of FIG. 4.

FIG. 9 is a cross-sectional view taken along line IX-IX' of FIG. 3, and FIG. 10 is a cross-sectional view taken along line X-X' of FIG. 4.

Referring to FIG. 9, the first block 1B includes first polymer chains 1BM, and each of the second blocks 2B includes second polymer chains 2BM. The first polymer chains 1BM and the second polymer chains 2BM have mutually exclusive chemical properties. The first polymer chains 1BM self-assemble together, and the second polymer chains 2BM self-assemble together. The first polymer chains 1BM self-assemble to form the first block 1B, and the second polymer chains 2BM self-assemble to form a plurality of cylindrical nano-structures.

Referring to FIG. 10, the polymer electret 11-1 has the second blocks 2B, which are formed by the second polymer chains 2BM that self-assemble together, removed therefrom.

The cylindrical nano-pores 2B are formed where the second blocks 2B are removed. The cylindrical nano-pores 2B may be charged with positive charge.

The polymer electret 11-1 may also include an elastomer or a fluorine-based polymer (FPM).

The elastomer or the fluorine-based polymer may be polymerized with the first polymer chains 1BM or the second polymer chains 2BM, thereby forming a copolymer. Alternatively, the elastomer or the fluorine-based polymer may be simply added to the first block 1B or the second blocks 2BM without bonding with the first polymer chains 1BM and the second polymer chains 2BM.

Figure 11:
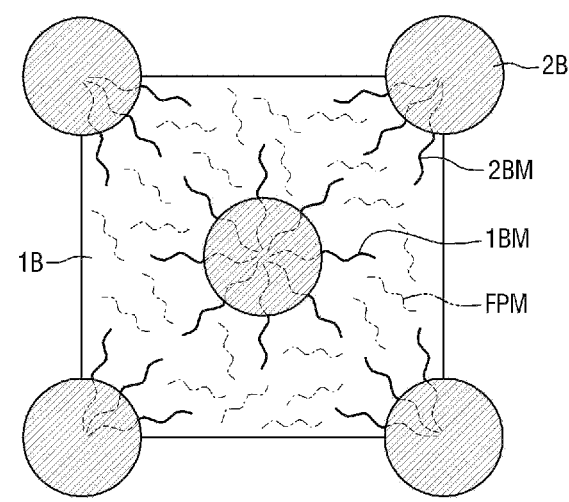
FIG. 11 is a diagram illustrating a modified example of the BCP self-assembly of FIG. 9, which includes a fluorine-based polymer.
Figure 12:
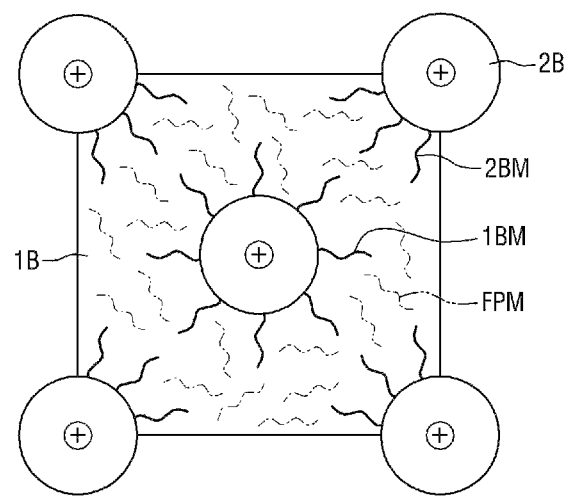
FIG. 12 is a cross-sectional view illustrating a polymer electret according to a fifth example embodiment.

FIG. 11 is a diagram illustrating a modified example of the BCP self-assembly of FIG. 9, which includes an FPM, and FIG. 12 is a cross-sectional view illustrating a polymer electret according to a fifth example embodiment.

A polymer electret 11'-2 with an FPM, according to the fifth example embodiment will hereinafter be described with reference to FIGS. 11 and 12.

Referring to FIG. 11, a self-assembly 11' of a BCP with cylindrical nano-structures differs from its counterpart of FIG. 9 in that it further includes an FPM.

The FPM may be polytetrafluoroethylene (PTFE), poly (perfluoroalkyl acrylate (PFA), polychlorotrifluoroethylene (PCTFE), fluorinated ethylenepropylene resin (FEP), poly-chloro-trifluoroethylene (PCFE), polyvinylidenefluoroide (PVDF), or a copolymer thereof.

The FPM may exist in a polymer formed by a first block 1B without bonding with first polymer chains 1BM that form the first block 1B, but the invention is not limited thereto. That is, the FPM may form a copolymer by being polymerized with the first polymer chains 1BM of the first block 1B.

Referring to FIG. 12, the polymer electret 11'-1 with cylindrical nano-structures differs from its counterpart of FIG. 10 in that it further includes an FPM.

Because the FPM contains fluorine with high electronegativity, the polymer electret 11'-1 with cylindrical nano-structures may be favorable for being charged with positive charge.

Each of the polymer electrets 10-1, 11-1, 12-1, 13-1 and 11'-1 according to example embodiments may be used as a diaphragm of an acoustic device. More specifically, each of the polymer electrets 10-1, 11-1, 12-1, 13-1 and 11'-1 may be used as a diaphragm of a condenser microphone, a diaphragm of a loud speaker converting variations in electric signals into acoustic vibrations that can be heard by humans, or a diaphragm of an ultrasound sensor.

While embodiments have been particularly shown and described with reference to example embodiments thereof, it will be understood by those of ordinary skill in the art that various changes in provide and detail may be made therein without departing from the spirit and scope of the invention. The example embodiments should be considered in a descriptive sense only and not for purposes of limitation.

What is claimed is:
1. A polymer electret, comprising:
   a polymer template; and
   a plurality of nanopores having a size of 5 nm to 100 nm, the plurality of nanopores arranged periodically in the polymer template;
   wherein the plurality of nanopores are electrically charged,
   wherein the polymer template and the plurality of nanopores originate from a self-assembly of a block copolymer (BCP) in which at least one first block and at least one second block are micro-phase-separated, the nanopore is formed where the first block is removed, and the polymer template is a self-assembly of the BCP having the first block removed therefrom and including the second block,
   wherein the first block is a self-assembly of a plurality of first polymer chains, and the second block is a self-assembly of a plurality of second polymer chains, and
   wherein the polymer template further includes a fluorine-based polymer.

2. The polymer electret of claim 1, wherein at least one of the plurality of nanopores is one selected from the group consisting of a spherical nanopore, a cylindrical nanopore, a gyroidal nanopore, a lamellar nanopore and a hexagonally perforated lamellar (HPL) nanopore.

3. The polymer electret of claim 1, wherein the fluorine-based polymer is at least one selected from the group consisting, of polytetrafluoroethylene (PTFE), poly(perfluoroalkyl acrylate) (PFA), polychlorotrifluoroethylene (PCTFE), fluorinated ethylenepropylene resin (FEP), poly-chloro-trifluoroethylene (PCFE), polyvinylidenefluoride (PVDF) and a copolymer thereof.

4. The polymer electret of claim 1, wherein the electric charge is positive charge.

5. The polymer electret of claim 1, wherein the BCP is at least one selected from the group consisting of PS-b-PB (polystyrene-b-polybutadiene)), PS-b-PI (polystyrene-b-polyisoprene), PS-b-PMMA (polystyrene-b-poly(methyl methacrylate)), PS-b-P2VP (polystyrene-b-poly(2-vinylpyridine)), PS-b-PFDMS (polystyrene-b-poly(ferrocenyl-dimethylsilane)), PS-b-PtBA (polystyrene-b-poly(tert-butylacrylate)), PS-b-PFEMS (polystyrene-b-poly (ferrocenylethylmethylsilane)), PI-b-PEO (polyisoprene-b-poly(ethyleneoxide)), PB-b-PVP (polybutadiene-b-poly (butadiene-b-vinylpyridinium)), PtBA-b-PCEMA (poly (tert-butylacrylate)-b-poly(cinnamoyl-ethylmethacrylate)), PS-b-PLA (polystyrene-b-polyactide), PaMS-b-PHS (poly (α-methylstyrene)-b-poly(4-hydroxystyrene)), PPDPS-b-P4VP (pentadecyl phenol modified polystyrene-b-poly(4-vinylpyridine)), PS-b-PEO (poly(styrene-b-ethyleneoxide)), PS-b-PDMS (polystyrene-b-poly(dimethyl siloxane)), PS-b-PE (polystyrene-b-polyethylene)), PS-b-PFS (polystyrene-b-poly(ferrocenyl dimethyl silane)), PS-b-PPP (polystyrene-b-poly(paraphenylene)), PS-b-PB-b-PS, PS-b-PI-b-PS, PEO-b-PPO (Poly(propyleneoxide))-b-PEO, PVPDMPS (poly(4-vinyl-phenyldimethyl-2-propoxysilane))-b-PI-b-PVPDMPS, PS-b-P2VP-b-PtBMA and a combination thereof.

6. The polymer electret of claim 1, wherein the first block is a hydrophobic block and the second block is a hydrophilic block.

* * * * *